May 6, 1930.  J. G. BLUNT  1,757,701
LOCOMOTIVE TRAILING TRUCK
Filed Oct. 12, 1928    4 Sheets-Sheet 1
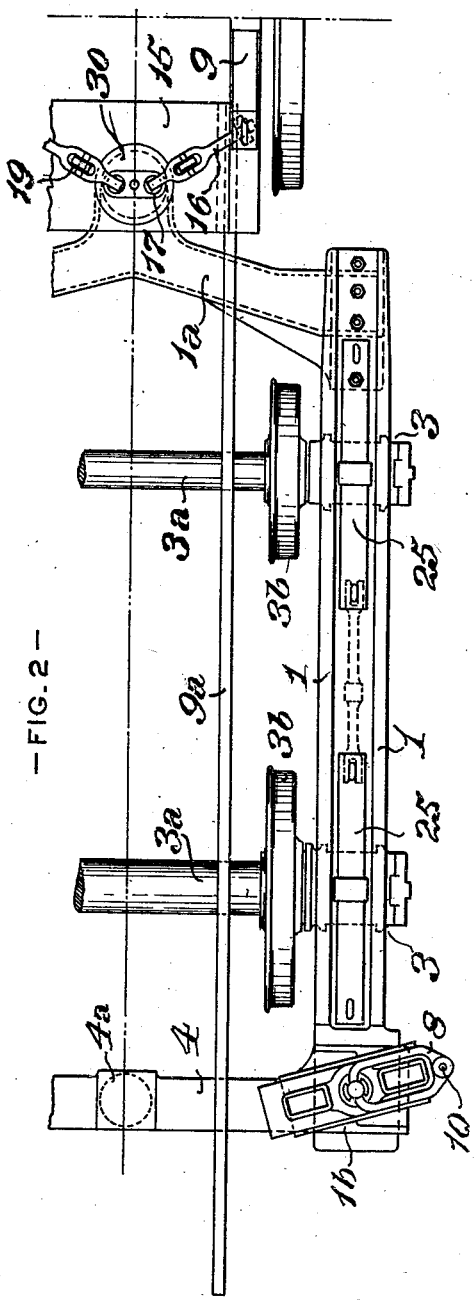
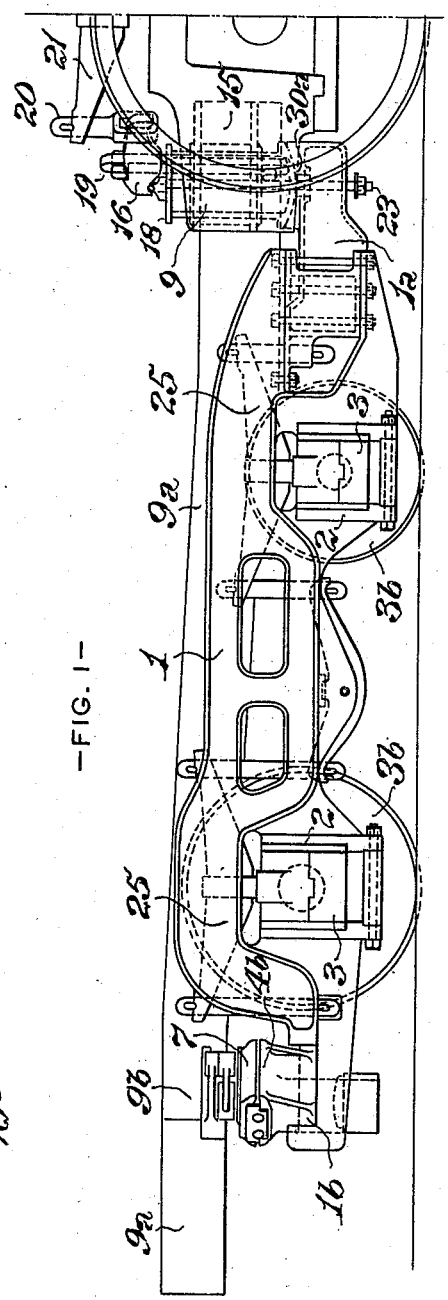

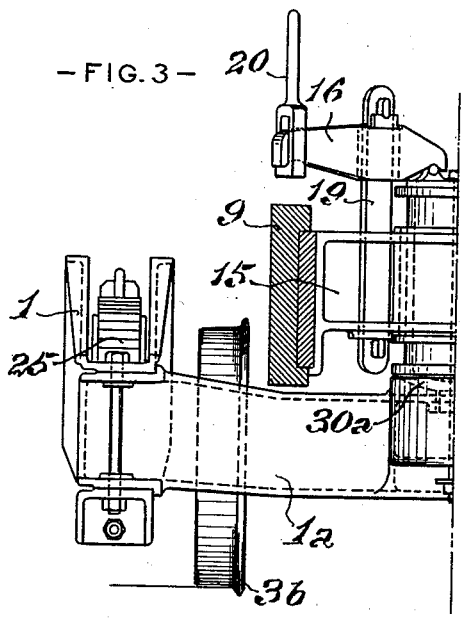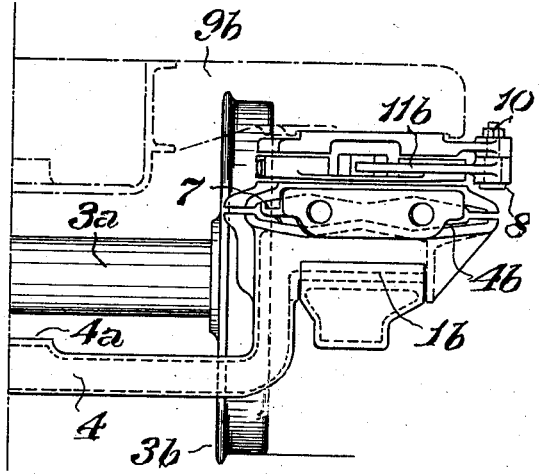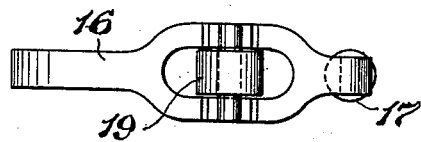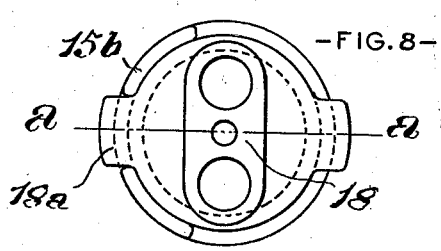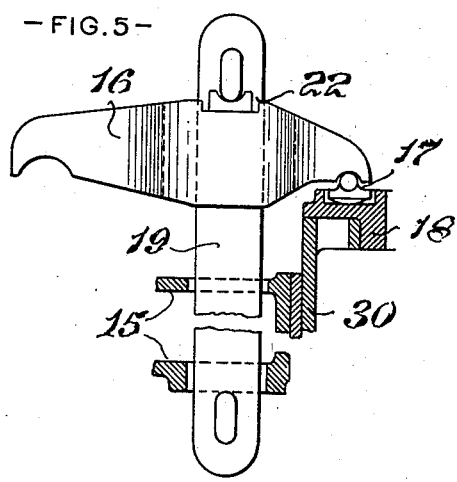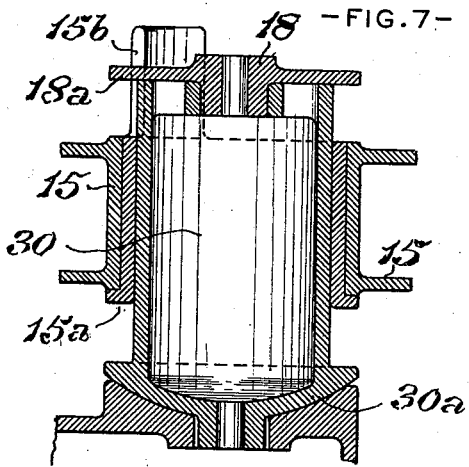

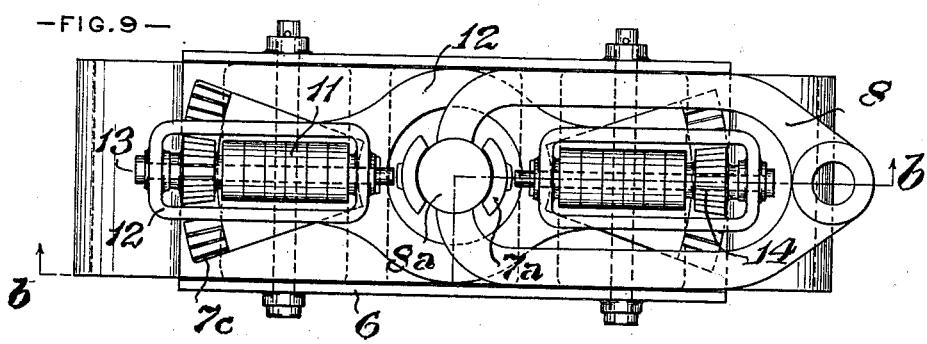
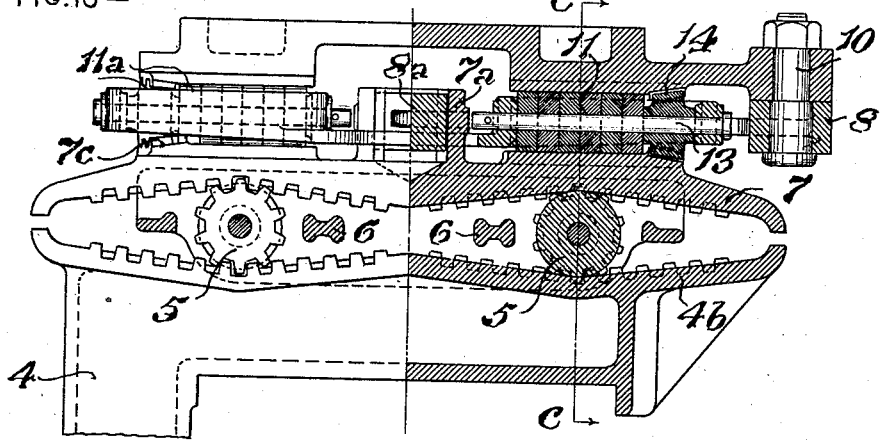
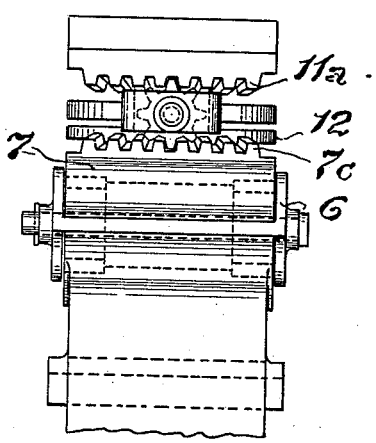
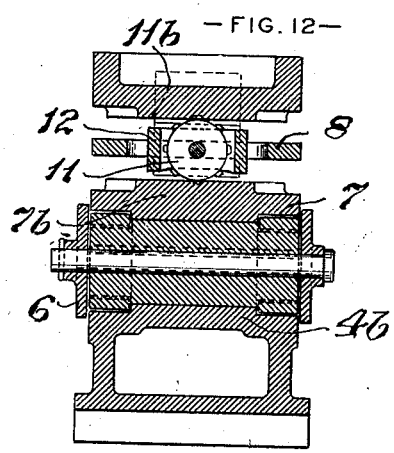

May 6, 1930.   J. G. BLUNT   1,757,701
LOCOMOTIVE TRAILING TRUCK
Filed Oct. 12, 1928   4 Sheets-Sheet 4
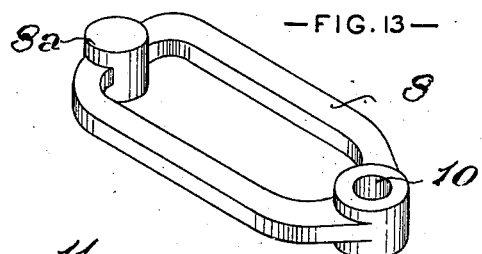
—FIG. 13—
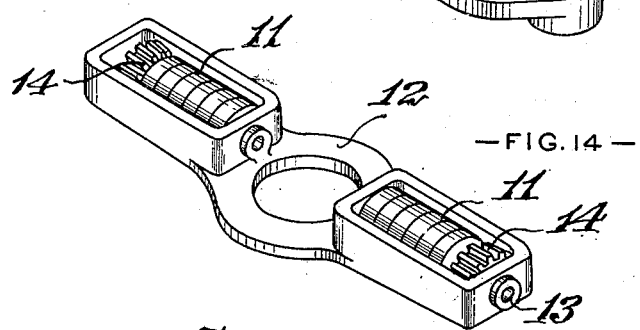
—FIG. 14—
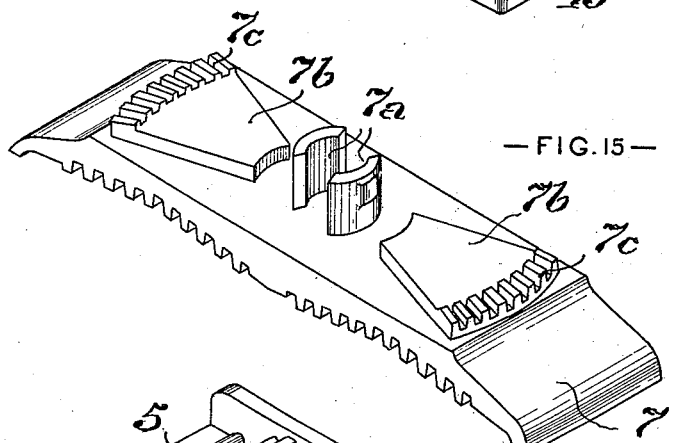
—FIG. 15—
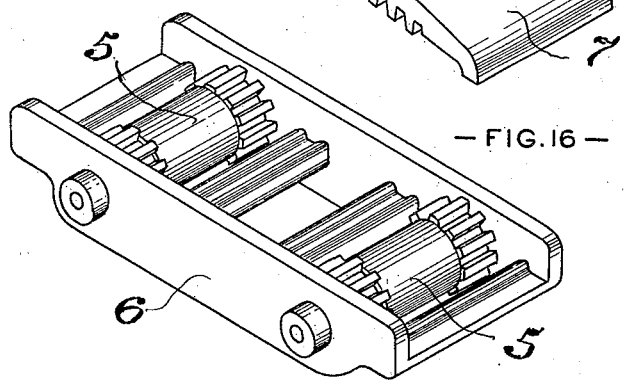
—FIG. 16—
WITNESSES
A. S. Vanderbilt
J. S. Payne
INVENTOR
James T. Blunt
by Howden Dill
Atty Patented May 6, 1930

1,757,701

UNITED STATES PATENT OFFICE

JAMES G. BLUNT, OF SCHENECTADY, NEW YORK

LOCOMOTIVE TRAILING TRUCK

Application filed October 12, 1928. Serial No. 312,046.

This invention relates, generally, to the class or type of appliances known as locomotive trailing trucks, and its object is to provide a structure of such type which will be of simple and inexpensive design; can be easily manufactured; will possess long life, and which will effect a substantial reduction in cost of maintenance.

Further objects of the invention are to provide for the assembly of the truck structure with the minimum possible number of bolts; to present a cross tie member adapted to form a support for a booster motor, with the lower elements of a lateral resistance device, capable of self adjustment to the lateral, radial, and fore and aft displacements of the truck, relatively to the locomotive main frame; and to utilize the truck frame for equalization of the relative superposed loads on the truck and on the driving wheel system, respectively.

The improvement claimed is hereinafter fully set forth.

In the accompanying drawings: Figure 1 is a side view, in elevation, of a four wheeled trailing truck, illustrating an embodiment of the invention; Fig. 2, a half plan or top view of the same; Fig. 3, a half front view; Fig. 4, a half rear view; Fig. 5, a side view, on an enlarged scale, of a front equalizer; Fig. 6, a plan view of the same; Fig. 7, a vertical section through the radius bar pin spindle, on the line $a\,a$ of Fig. 8; Fig. 8, a plan view thereof; Fig. 9, a plan view of the centering device, with the upper roller seat plate removed; Fig. 10, a longitudinal section through the same, on the line $b\,b$ of Fig. 9; Fig. 11, an end view of the centering device; Fig. 12, a vertical section through the same, on the line $c\,c$ of Fig. 10; Fig. 13, an isometrical view of a roller seat yoke; Fig. 14, a similar view of a roller yoke; Fig. 15, a similar view of a transverse upper roller seat, and; Fig. 16, a similar view of the geared rollers and their yoke.

In the practice of the invention, referring descriptively to the specific embodiment thereof in a four wheeled trailing truck, which is herein exemplified, the frame of the truck comprises two longitudinally extending side members, 1, 1, a transverse front cross tie member, 1ª, connected, at its ends, thereto, and a transverse rear cross tie member, 4, connected, at its ends, to the rear ends of the side members. Pedestals, 2, are formed in the side members, in which pedestals are fitted the journal boxes, 3, of the axles, 3ª, on which are secured the wheels, 3ᵇ. The side members extend rearwardly beyond the rear pair of pedestals, and terminate in seats, 1ᵇ, on which the ends of the cross tie, 4, rest.

The cross tie, 4, is in the form of a hollow box beam, depressed sufficiently to pass under a booster motor, and provided, at its centre, with a bearing, 4ª, for the support of a booster motor. Oppositely inclined and rack toothed roller seats, 4ᵇ, which constitute the lower element of the centering device, are formed on the cross tie, 4, directly above where it rests on the rearward extensions of the side members, 1. By this construction, there is provided a truck frame structure in which a booster support and an element of the centering device, are combined in an integral member.

The centering device providing resistance to the lateral displacement of the truck frame, relative to the locomotive frame, and effecting return of the parts to normal central position after displacement, embodies two geared rollers, 5, yoked together by a frame, 6, to insure simultaneous movement, and operating between the lower roller seats, 4ᵇ, formed on the cross tie, 4, and upper roller seats, 7, yoked to the locomotive frame structure. The roller seats are formed of oppositely inclined planes, the angle of inclination being proportionate to the amount of resistance desired. The teeth on the ends of the rollers, are of the same pitch diameter as the diameter of the body of the roller, and engage racks formed along the front and back edges of the roller seats. These teeth are for the purpose of producing positive rolling action of the rollers on the seats.

The employment of geared rollers, operating on inclined planes to produce the necessary centering effort on trailer trucks, is not broadly new, but this invention is novel, in locating such a centering device in rear of the truck wheels, as is necessary when the truck frame functions as an equalizer, and providing a more complete structure to compensate for all the relative movements between the truck and the locomotive frame, which has not been accomplished in former designs.

The upper roller seats are linked to the locomotive frame structure, by the yoke, 8, fastening to outwardly projecting extensions, $9^b$, of the locomotive rear frame members, $9^a$, by the swivel pin, 10, and engaging with the upper roller seats, 7, by means of the trunnion, $8^a$, fitting into the socket, $7^a$, to prevent sidewise movement. The lower roller seats, $4^b$, being part of the truck structure, move with the truck. The lower edges of the roller frames, 6, overlapping the sides of the lower roller seats, $4^b$, take the same direction as the lower roller seats, $4^b$, and the upper edges of the roller frames, 6, sliding against the edges of the upper roller seats, 7, twist them until their direction corresponds with that of the lower roller seats. Another set of rollers, 11, operate between the seats, $7^b$, formed in the upper surfaces of the upper geared roller seats, 7, and the seats, $11^b$, which are secured to the frame extensions, $9^b$, and carry bosses on their outer extremities, for the fastening of yoke swivel pin, 10. Fore and aft movement is accomplished by the swiveling of the yokes, 8, around the pins, 10, and trunnions, $8^a$, in the sockets, $7^a$, while the rotary movement of the upper roller seat, 7, is accomplished by providing radial movement of the roller yoke, 12, about the centre point of the upper roller seats, 7. The rollers, 11, are made up of a series of short lengths, to compensate for the difference in travel at points of increasing distance from the centre of rotation, and, on the same arbors, 13, which carry the rollers, are mounted two conical gears, 14, meshing in circular racks, $7^c$, and $11^a$, formed in the roller seats to provide positive rotary movement between the upper geared roller seat 7 and the seat $11^b$ to adjust for variation between the radial movement of the truck and the straight line movement of the geared roller seats relative to each other. The roller yokes, 12, housing the rollers, 11, and gears, 14, are widened at the centre to clear the trunnions, $7^a$, and are formed to clear the yokes, 8, in all directions.

The frame members, 1, are, supported through springs, 25, on the axle boxes, 3, working in the pedestals, 2, and receive their proportion of the weight of the locomotive at three points, two at rear, through the centering devices, and the other at the front, on the seat, $30^a$. The rear points of loading, at the centering devices, have no capacity for vertical movement, but the front point of loading, on the seat, $30^a$, bears upwardly against the spindle, 30, which may rise and fall in its guide, $15^a$, which is a part of the frame crosstie, 15, at the joint of the main frames 9, and the rear frame extensions, $9^a$. In order to proportion the relative amount of load carried by the truck and the driving spring system, equalizers, 16, are introduced, their inner ends bearing downwardly on top of the spindle, 30, through rocking seats, 17, resting on the spindle cover, 18, fulcrumed, through links, 19, the lower ends of which are gibbed against the web of the frame crosstie, 15, and their outer ends hooked into the rear spring hangers, 20, of the rear driving springs, 21. To obtain a more exact equalization of weight between the trailer truck and the driving wheels, the equalizers, 16, are recessed on top, somewhat longer than the gib seat, 22, so that this gib seat can be moved one way or the other in the recess, to give the desired length of equalizer arms, after which the gib seat, 22, is welded fast in the recess of the equalizer.

The spindle bearing seat, $30^a$, is spherical in form, to compensate for vertical movement of the spindle, 30, while still retaining full contact with it, but as the truck frame members, 1, swivel, there would be a tendency to rotate the spindle, 30, which would disturb the seating arrangement of the inner ends of the equalizers 16. To prevent possible rotation of the spindle, 30, the wall of the spindle guide, $15^a$, is provided with upward extensions, $15^b$, spaced apart to admit between them horizontal extensions, $18^a$, on the spindle top 18. Extensive separation of the truck frame members, 1, from the spindle, 30, is prevented by a central rod, 23, seated on the spindle top, 18, and passing downwardly through the centre of the spindle, with a nut and washer on its lower end, a predetermined distance below the underside of the frame member $1^a$.

It will be noted that the foregoing description is that of a trailing truck having two axles, but the same principles of construction and operation are applicable in trucks having a single axle, or more than two axles.

The term rear frame as used in the specification and the claims is intended to include any portion of the supporting or frame structure which extends rearwardly over the trailing truck, and the term main frame is intended to mean the portion of the frame structure carried by the driving axles.

The construction herein set forth possesses the advantages of simplicity of design, involving no complicated castings, and of easy fabrication, with a minimum number of bolts; a reduced number of parts, by making some of the parts effect more than one function; providing a centering device capable of adjusting itself to all relative movements of the truck and locomotive frame; and providing adjustably equalized distribution of weight with that carried on the driving wheels.

The invention claimed and desired to be secured by Letters Patent is:

1. A locomotive trailing truck, comprising side frame members, having axle box pedestals and bearing upwardly through a cross member at their forward ends against a central spindle; and a transverse frame member, at the rear extremities of the side frame members, said transverse frame member being adapted to the support of a booster motor.

2. A locomotive trailing truck, comprising side frame members, having axle box pedestals and bearing upwardly through a cross member at their forward ends against a central spindle; and a detachable transverse frame member, at the rear extremities of the side frame members, and carrying the lower members of a centering device.

3. A locomotive trailing truck centering device, comprising rollers, operating between oppositely inclined rollers seats, and meshed therewith by gear teeth, said centering device exerting resistance to the lateral displacement of the truck; rollers, superposed on the upper geared roller seats, and enclosed in a yoke, rotatable about the axis of the geared roller seat; and a link, swivellingly connected, at its outer end, to the locomotive main frame, and trunnioned in the upper geared roller seat.

4. A locomotive trailing truck, supporting its load at three points, two of said supporting points being geared roller centering devices located at the rear ends of the truck frame side members, and the third of which is located in the longitudinal vertical plane of the locomotive.

5. A locomotive trailing truck, supporting its load at three points, two of said supporting points being geared roller centering devices located at the rear ends of the truck frame side members, and the third located in the longitudinal vertical plane of the locomotive, and seated on a spherical bearing surface.

6. A locomotive trailing truck, supporting its load at three points, two of said supporting points being centering devices located at the rear ends of the truck frame side members, and the third of which being a spindle, located in the longitudinal middle plane of the locomotive, and equalizers, bearing on said spindle, at one end, and connected to the driving wheel spring system of the locomotive, at the other end, said equalizers acting to effect distribution of the load between the driving wheels and the truck.

7. A locomotive trailing truck, supporting its load at three points, two of said supporting points being centering devices located at the rear ends of the truck frame side members, and the third of which being a spindle, located in the longitudinal middle plane of the locomotive, and equalizers, interposed between said spindle and the driving wheel spring system, and adjustably fulcrumed on the locomotive main frame.

8. A locomotive trailing truck centering device comprising rollers operating between oppositely inclined roller seats and meshed therewith by gear teeth, said centering device exerting resistance to the lateral displacement of the truck; rollers in contact with one of the geared roller seats and enclosed in a yoke rotatable about the axis of the geared roller seat which is in contact with said rollers, and means to prevent lateral movement of the yoke.

9. A locomotive trailing truck centering device comprising rollers operating between oppositely inclined roller seats and meshed therewith by gear teeth, said centering device exerting resistance to lateral displacement of the truck; rollers in contact with one of the geared roller seats enclosed in a yoke and meshed with the geared roller seat in a manner to provide rotary movement of the yoke about the axis of the geared roller seat, and means to prevent the lateral movement of said yoke.

10. In a locomotive trailing truck, a frame cross member on which is mounted a lateral resistance device for supporting a portion of the locomotive structure while permitting radial movement of the truck frame relative to said structure, and means for supporting thereon that portion of a trailer booster motor not supported on the trailer truck axle.

11. In a centering device for locomotive trailing trucks, means to preserve the parallel alignment between the elements of the centering device throughout their lateral range of movement.

12. In a locomotive, the combination of a rear frame; a trailing truck frame; a pivotal connection coupling the trailing truck frame to the rear frame with the capacity of radial movement to permit the relative lateral displacements between the frames required for traversing curved track; and a centering device interposed between the frames, supporting the load of the rear frame on the truck frame, and comprising a pair of opposed inclined seats disposed in transverse and longitudinal alignment one above the other, one seat connected to each frame for movement therewith longitudinally of the other seat, a bearing member between the seats, and means permitting one of the seats to move relatively to the frame to which it is connected so as to maintain the transverse alignment of the seats when the seats are moved longitudinally one of the other.

13. In a locomotive, the combination of a rear frame; a trailing truck frame; a pivotal connection coupling the trailing truck frame to the rear frame with the capacity of radial movement to permit the relative lateral displacements between the frames required for traversing curved track; and a centering device interposed between the frames at each side of the truck frame, supporting the load of the rear frame on the truck frame, and each comprising a pair of opposed inclined seats disposed in transverse and longitudinal alignment one above the other, one seat connected to each frame for movement therewith longitudinally of the other seat, a bearing member between the seats, and means permitting one of the seats to move relatively to the frame to which it is connected so as to maintain the transverse alignment of the seats when the seats are moved longitudinally one of the other.

14. In a locomotive, the combination of a rear frame; a trailing truck frame; a pivotal connection coupling the trailing truck frame to the rear frame with the capacity of radial movement to permit the relative lateral displacements between the frames required for traversing curved track; and a centering device interposed between the frames, supporting the load of the rear frame on the truck frame, and comprising a pair of opposed inclined seats disposed in transverse and longitudinal alignment one above the other, one seat connected to each frame for movement therewith longitudinally of the other seat, a bearing member between the seats, and means permitting one of the seats to swivel and move fore and aft relatively to the frame to which it is connected so as to maintain the transverse alignment of the seats when the seats are moved longitudinally one of the other.

15. In a locomotive, the combination of a rear frame; a trailing truck frame; a pivotal connection coupling the trailing truck frame to the rear frame with the capacity of radial movement to permit the relative lateral displacements between the frames required for traversing curved track; and a centering device interposed between the frames at each side of the truck frame, supporting the load of the rear frame on the truck frame, and each comprising a pair of opposed inclined seats disposed in transverse and longitudinal alignment one above the other, one seat connected to each frame for movement therewith longitudinally of the other seat, a bearing member between the seats, and means permitting one of the seats to move relatively to the frame to which it is connected so as to maintain the transverse alignment of the seats when the seats are moved longitudinally one of the other, said means comprising a pair of opposed seats and a bearing member interposed therebetween.

16. In a locomotive, the combination of a rear frame; a trailing truck frame; a pivotal connection coupling the trailing truck frame to the rear frame with the capacity of radial movement to permit the relative lateral displacements between the frames required for traversing curved track; and a centering device interposed between the frames at each side of the truck frame, supporting the load of the rear frame on the truck frame, and each comprising a pair of opposed inclined seats disposed in transverse and longitudinal alignment one above the other, one seat connected to each frame for movement therewith longitudinally of the other seat, a bearing member between the seats, and means permitting one of the seats to swivel and move fore and aft relatively to the frame to which it is connected so as to maintain the transverse alignment of the seats when the seats are moved longitudinally one of the other, said means comprising a pair of opposed seats and a bearing member interposed therebetween.

17. In a locomotive, the combination of a rear frame; a trailing truck frame; a pivotal connection coupling the trailing truck frame to the rear frame with the capacity of radial movement to permit the relative lateral displacements between the frames required for traversing curved track; and a centering device interposed between the frames, supporting the load of the rear frame on the truck frame, and comprising a pair of opposed inclined seats disposed in transverse and longitudinal alignment one above the other, one seat connected to each frame for movement therewith longitudinally of the other seat, a bearing member between the seats, and means permitting one of the seats to swivel and move fore and aft relatively to the frame to which it is connected so as to maintain the transverse alignment of the seats when the seats are moved longitudinally one of the other, said means comprising a pair of opposed seats, a bearing member interposed between the seats, and a member having one end pivotally connected to one of the frames, and its other end pivotally connected to one of the inclined seats.

18. In a locomotive, the combination of a rear frame; a main frame; a vertical floating spindle carried by the main frame; a main equalizing system supporting the main frame; an equalizing lever fulcrumed on the main frame having one end bearing downwardly on the spindle and its other end connected to the equalizer system; and a truck frame bearing the load of the rear frame and having one end pivotally connected to the spindle and bearing upwardly thereagainst, whereby the loads borne by the truck and the main equalizing system are equalized.

19. In a locomotive, the combination of a rear frame; a main frame; a vertical floating spindle carried by the main frame; an equalizing system supporting the main frame; an equalizing lever having one end bearing downwardly on the spindle and its other end connected to the equalizer system; a truck frame having one end pivotally connected to the spindle and bearing upwardly thereagainst, whereby the loads borne by the truck and the main equalizing system will be equalized; and a centering device interposed between the frames, supporting the load of the rear frame on the truck frame, and comprising a pair of opposed inclined seats disposed in transverse and longitudinal alignment one above the other, one seat connected to each frame for movement therewith longitudinally of the other seat, a bearing member between the seats, and means permitting one of the seats to swivel and move fore and aft relatively to the frame to which it is connected so as to maintain the transverse alignment of the seats when the seats are moved longitudinally one of the other.

20. In a locomotive, a locomotive frame, a rear truck frame, and means for supporting the rear of the locomotive frame upon the rear truck frame and interposed therebetween, comprising superimposed load supporting elements disposed respectively for movement substantially in directions transverse and longitudinal to the locomotive frame.

JAMES G. BLUNT.